United States Patent [19]

Terui et al.

[11] Patent Number: 4,483,565
[45] Date of Patent: Nov. 20, 1984

[54] HEAD REST STAY RETAINING DEVICE

[75] Inventors: Mituru Terui, Yokohama; Youki Yoshida, Yokosuka, both of

[73] Assignee: Ikeda Bussan Co., Ltd., Yokohama, Japan

[21] Appl. No.: 276,280

[22] Filed: Jun. 22, 1981

[51] Int. Cl.³ .............................................. A47C 7/38
[52] U.S. Cl. ..................................... 297/410; 297/216
[58] Field of Search ................ 297/410, 591, 414, 216

[56] References Cited

U.S. PATENT DOCUMENTS

| | | | |
|---|---|---|---|
| 410,296 | 9/1889 | Schneekloth | 297/410 |
| 1,714,696 | 5/1929 | Samuelian | 297/410 |
| 1,867,600 | 7/1932 | Schwarzkopf | 297/410 |
| 2,584,732 | 2/1952 | Okun | 297/414 |
| 3,877,751 | 4/1975 | Rasmussen | 297/410 |
| 4,128,274 | 12/1978 | Schmedemann | 297/410 |

*Primary Examiner*—Francis K. Zugel
*Attorney, Agent, or Firm*—Jordan and Hamburg

[57] ABSTRACT

A head rest stay retaining device has an engagement face provided on the stay thereof which supports the head rest. The engagement face is formed continuously to a predetermined length along the axis thereof, and it further has a pushing member with an engagement face forced so as to be in contact with the engagement face of the stay, thereby retaining the stay, due to the engagement between these two engagement faces. In one version, the engagement face on the stay may taper inwards in a downwards direction, towards the axis of the stay; this engagement face may be knurled. The pushing member may be spring-loaded and/or with a grooved or corrugated engagement face, which may engage the tapered and/or knurled engagement face of the stay. The pushing member may be eccentrically mounted or pivoted or the like, and in a generally elliptical form or other non-circular shape or configuration.

22 Claims, 11 Drawing Figures

HEAD REST STAY RETAINING DEVICE

BACKGROUND OF THE INVENTION

1. Field of the Invention

The present invention generally relates to a head rest stay retaining mechanism, and more particularly to a head rest stay retainer which is provided atop the back of a seat, and which retains the head rest stay in such a manner that the stay can be moved vertically in relation to the seat back, when the head rest height is to be adjusted.

2. Description of the Prior Art

Such devices have been proposed; one of them is disclosed in the Japanese Utility Model Publication No. Sho-51-24664, for example, which consists, as illustrated in FIG. 1, of an engagement retainer 100 which is provided on the top face of a seat back 1 and retains a head rest 2 at the stay 3 thereof, and a support cylinder 101 provided within the seat back 1 to vertically guide the head rest stay 3. The engagement retainer 100 comprises a casing 111 which encloses the stay 3 of head rest 2, an engagement plate 112 housed in the casing 111 in such a manner that it may be displaceable perpendicularly to the axis of the stay 3, said plate 112 having a locking hole 114 through which the stay 3 penetrates or extends, and a spring 113 which forces the engagement plate 112 in the direction of engagement with one of cuts or recesses 31 provided in the stay 3. As obvious to those skilled in the art, this prior-art device is disadvantageous in operation and structure; namely, in order to vertically move the head rest 2, the peripheral edge 114a of the locking hole 114 must be disengaged from the cut 31 each time by forcing the engagement plate 112 against the action of the spring 113. Further, the structure of this device is rather complicated.

Besides, since the engagement of the peripheral edge 114a of the locking hole 114 in the engagement plate 112 into the cut 31 in the stay depends upon the magnitude of the force of the spring 113, the effort necessary to push the operating piece 115 attached to the engagement plate 112 in the direction of the casing 111, in order to disengage the peripheral edge 114a from the cut 31 and vertically move the stay 3, must be as great as the degree of engagement with the stay 3, which means a poor operability of the device. Namely, when operating the prior-art device in FIG. 1, a very great effort by the finger is required, and it is inconvenient that the stay 3 must be vertically moved while pressing the operating piece 115 to the casing 111, to move the engagement plate 112 directly against the force of the spring 113. For accurate engagement and disengagement between the cut 31 in the stay 3 and the peripheral edge 114a of the locking hole 114, the engagement plate 112 must be moved straight. To this end, a pair of springs 113 which have the same spring force is needed. Further, to assure that the engagement plate 112 will not be moved as deviated, but will move straight under the action of the springs 113, there must be provided in the engagement plate 112 a slot 116 of a length corresponding to the displacement of the plate 112, and a pin 117 which will engage in the slot 116 must be press-fitted from the top of the casing 111. Thus, the structure of the head rest stay retaining device is very complicated.

SUMMARY OF THE INVENTION

Purposes of the Invention

Accordingly, the present invention has as an object to overcome the drawbacks of the prior-art devices, by providing a head rest stay retaining device of a simplified structure and thus with a lower manufacturing cost, easy to operate, and so securely retaining the head rest as to assure the safety of the user.

Another object of the present invention is to provide a head rest stay retaining device in which there is provided on the stay an engagement face which is formed continuously to a predetermined length along the axis of the stay, and in which an engagement face of a pushing member is so forced as to be in forced contact with said engagement face of said stay, thus retaining the latter.

Yet another object of the present invention is to provide a head rest stay retaining device in which a pushing member with a face which engages the engagement face formed on the stay, is constantly forced about a pivotal axis in the direction of engagement on said engagement face, and in which a knob is provided which, when depressed, turns the pushing member in a direction opposite to said forced direction, to disengage said face of the pushing member from said engagement face on the stay.

According to a further object of the present invention, the head rest stay is retained due to the forced engagement of the engagement face formed on the stay with the engagement face of the pushing member, thus ensuring the retention of the stay and simplifying the structure.

Also, an additional object is to provide a pushing member which is in forced engagement at the engagement face thereof with the engagement face formed on the stay, and which is easily turned about the pivotal axis by simply depressing the knob; namely, the inventive device is very easily operable.

An object is to provide a head rest stay retaining device in which there is provided an engagement face on the stay, the engagement face being formed continuously to a predetermined length along the axis of the stay and tapered nearer to the axis of the stay in a downward direction.

Other objects and advantages of the present invention will be better understood from the following description provided, by way of example, to include the preferred embodiments according to the present invention, and with reference to the accompanying drawings.

BRIEF DESCRIPTION OF THE INVENTION

The present invention generally relates to a head rest stay retaining mechanism, and more particularly to a head rest stay retainer which is provided atop the back of a seat, and which retains the head rest stay in such a manner that the stay can be moved vertically in relation to the seat back, when the head rest height is to be adjusted.

The present head rest stay retaining device has an engagement face provided on the stay thereof which supports the head rest. The engagement face is formed continuously to a predetermined length along the axis thereof, and it further has a pushing member with an engagement face formed so as to be in contact with the engagement face of the stay, thereby retaining the stay, due to the engagement between these two engagement faces. In one version, the engagement face on the stay may taper inwards in a downwards direction, towards the axis of the stay; this engagement face may be knurled. The pushing member may be spring-loaded and/or with a grooved or corrugated engagement face, which may engage the tapered and/or knurled engagement face of the stay. The pushing member may be eccentrically mounted or pivoted or the like, and, in a generally elliptical form or other non-circular shape or configuration.

The invention accordingly consists in the head rest stay retaining device as described supra, and as will appear infra from the drawings and from the detailed description of the invention, and as elucidated in the recitations of the appended claims.

BRIEF DESCRIPTION OF THE DRAWINGS

Referring now to the drawings, in which are shown several embodiments of the present invention.

DETAILED DESCRIPTION OF THE PREFERRED EMBODIMENTS

Figure 1:
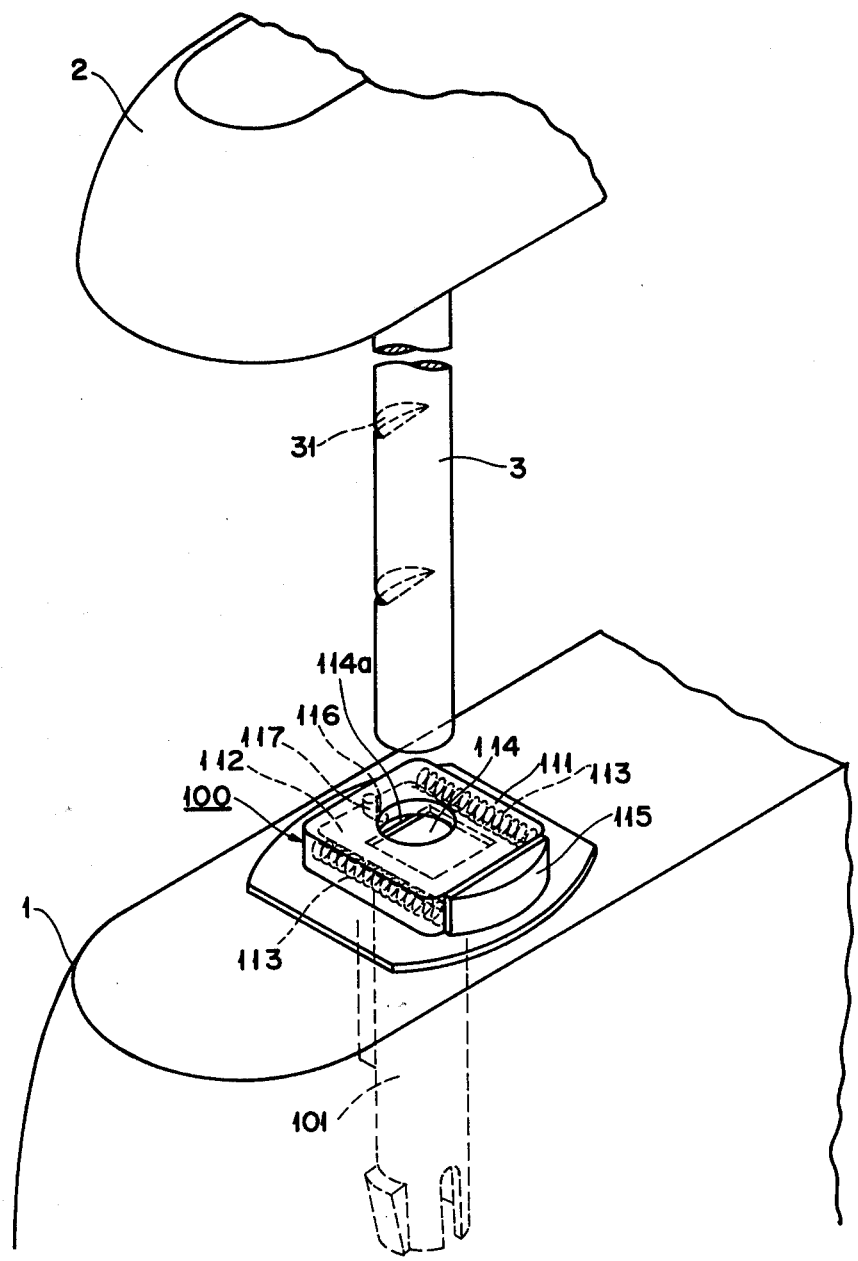
FIG. 1 is a perspective view of a prior-art head rest stay retaining device.
Figure 2:
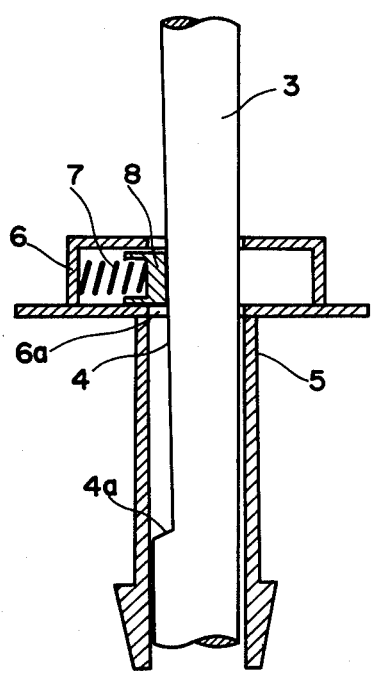
FIG. 2 is a sectional view of one embodiment of the head rest stay retaining device according to the present invention.

Referring now to FIG. 2, the inventive head rest stay retaining device comprises a stay 3 provided in one side thereof with a tapered engagement face 4 which becomes progressively closer to the axis of the stay 3 in a downward direction. The lower end of this engagement face 4 terminates in a step 4a which prevents the stay 3 from coming out of the device or out of the seat back. The stay 3 is inserted in and vertically movable as guided by a support cylinder 5. Formed atop the support cylinder 5 is a casing 6 provided with an opening or hole 6a through which the stay 3 extends or penetrates. There is provided within this casing 6 a pushing member 8 which is so forced and biased by an elastic means such as spring 7 as to be in forced contact with the engagement face 4 on the stay 3.

Although the engagement face 4 is formed in only one side face of the stay 3 as seen in FIG. 2, it is possible, and will be evident to those skilled in the art, that another engagement face 4 may be also formed in the opposite side of the stay 3, and correspondingly another pushing member 8 be provided within the casing 6, in such a way that the stay 3 is pressed at the both side faces thereof by the two pushing members 8.

Figure 3:
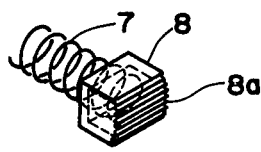
FIG. 3 is a perspective view showing a variation of the pushing member for use in the head rest stay retaining device in FIG. 2.
Figure 4:
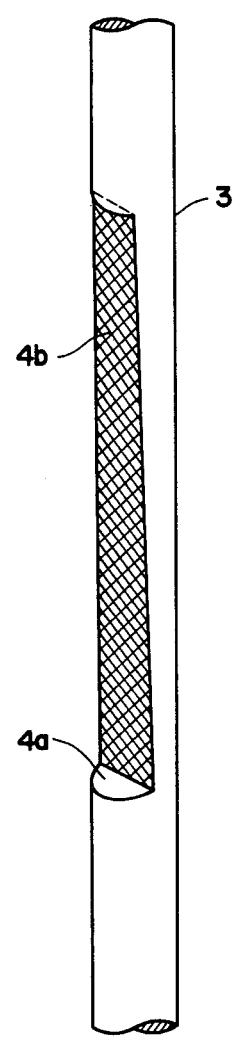
FIG. 4 is a perspective view showing a variation of the engagement face of the stay for use in the head rest stay retaining device in FIG. 2.

According to another aspect of the present invention, an engagement face 8a of the pushing member 8 which is in forced engagement or contact with said engagement face 4 on the stay 3 may be formed as a successively grooved or corrugated element, as shown in FIG. 3, in order to enhance the retention of the stay 3. Such corrugation or the like may also be provided on the engagement face 4 of the stay 3, so that the corrugated faces on the stay 3 and pushing member 8 may be in more effective forced contact with each other. Further, knurling may be adopted instead of the corrugating; for example, as shown in FIG. 4, the engagement face 4 may be knurled as shown at 4b. Of course, it is possible to freely select any of the combinations, namely, plain facing, corrugated facing or knurled facing.

In case of the above-described retaining devices, the head rest can be adjusted in height simply by pulling up or depressing the head rest 2. The engagement face 4 of the stay 3 slides over the engagement face of the pushing member 8 while the pushing member 8 moves forward and rearward, thus permitting the stay 3 to freely move. When the head rest 2 is stopped in a position, the pushing member 8 will be in forced contact at the front or engagement face thereof with the engagement face 4 of the stay 3 so that the stay will be retained in place at the position where the head rest is stopped. Should another car collide with the car at the rear thereof, when the user's head collides with the head rest, a force due to the collision will act on the head rest so as to force it downward. If the head rest is lowered suddenly, it means that such head rest stay retaining device is not satisfactory from the standpoint of safety. In the device according to the present invention, however, the engagement face 4 on the stay 3 is tapered downward or nearer the axis of the stay as it goes down; this strucure will provide for an engagement, with a greater force, of the pushing member 8 onto the engagement face 4 of the stay 3 as the stay goes down, thus preventing the stay 3 from falling suddenly.

Figure 5:
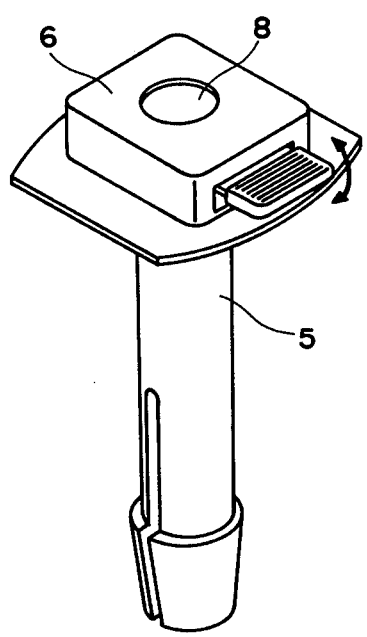
FIG. 5 shows perspectively another embodiment of the head rest stay retaining device according to the present invention.
Figure 7:
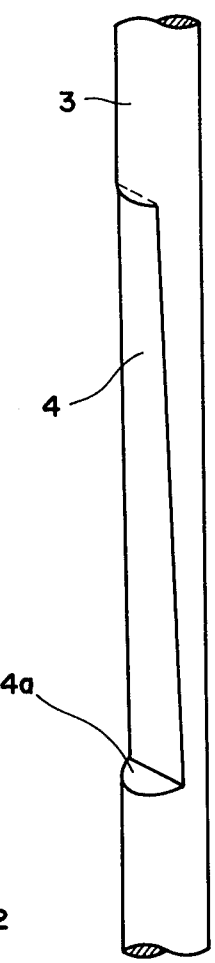
FIG. 7 is a perspective view illustrating the engagement face on the stay for use in the head rest stay retaining device in FIG. 5.
Figure 6:
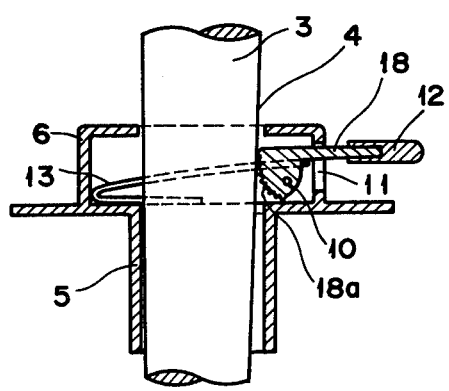
FIG. 6 is a sectional view of the head rest stay retaining device in FIG. 5.
Figure 8:
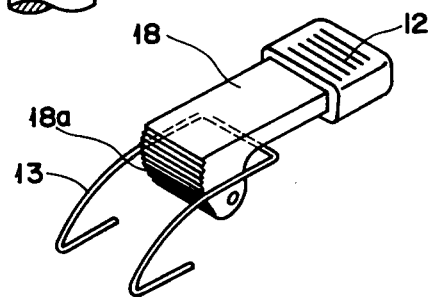
FIG. 8 is a perspective view of the pushing member for use in the head rest stay retaining device in FIG. 5.
Figure 9:
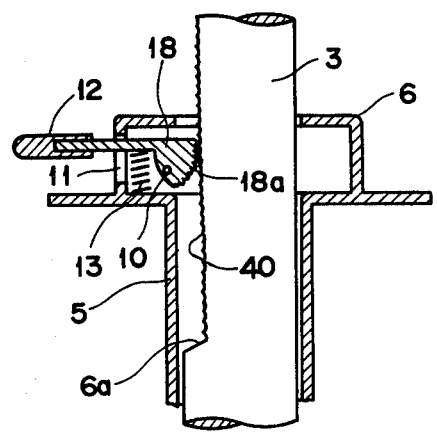
FIG. 9 is a sectional view illustrative of a third embodiment of the head rest stay retaining device according to the present invention.

Another embodiment of the present invention is illustrated in FIGS. 5 and 6; this head rest stay retaining device comprises, similar to the embodiment shown in FIG. 2, a support cylinder 5 and casing 6 through which the stay 3 extends or penetrates. The stay 3 has formed thereon a tapered engagement face 4 as seen in FIG. 7. As shown in detail in FIG. 6, there is installed within said casing 6, pivotably about a pin 10, a pushing member 18, the free end of which is projected out through a hole 11 formed in the side face of the casing 6 and provided with a knob 12. The inner end of the pushing member 18 which is positioned within the casing 6 is formed approximately elliptic, and the inner end face is formed into a corrugated engagement face 18a. The knob 12 is pivotable about the pin 10, which is positioned eccentric from the center of the ellipse. Forced engagement of the engagement face 18a of the pushing member 18 with the face 4 on the stay 3 permits retention of the stay and prevents it from falling. The knob 12 of said pushing member 18 is always forced upward and biased by means of a spring 13 provided within the casing 6; this spring 13 may be a wire spring as shown in FIG. 8 or a coil spring as shown in FIG. 9, and may be provided either within or outside the casing 6. Any type of spring may be selected, for this use, which would force upward the knob 12 of the pushing member 18. The engagement face 4 formed in said stay 3 on at least one side thereof is tapered nearer the axis of the stay 3 as it goes down as shown in FIG. 7; the lower end of the engagement face ends in a step 4a, which prevents the stay 3 from coming out at the top of the casing or out of seat back. The engagement face 4 shown in FIG. 7 may be knurled or corrugated as shown at 40 in FIG. 9.

Figure 10:
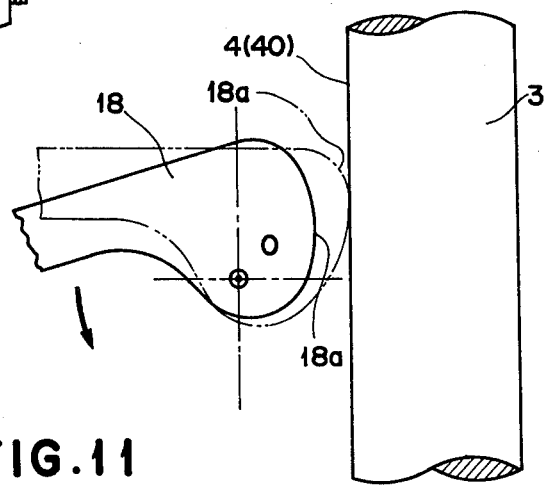
FIG. 10 is illustrative of the manner of operating the pushing member used in the head rest stay retaining device according to the present invention.
Figure 11:
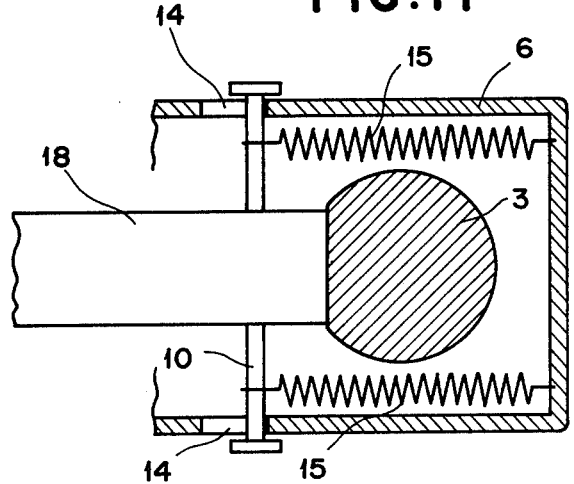
FIG. 11 is a sectional view showing a fourth embodiment of the head rest stay retaining device.

The head rest stay retaining device according to the present invention functions as follows: By depressing the knob 12 of the pushing member 18 against the elasticity of the spring 13, the engagement of the engagement face 18a with the engagement face 4 or 40 on the stay 3 is released as shown in FIG. 10. Namely, the pushing member 18 pivots about the pivotal point "O" from the position defined by the imaginary, or two dot and dash line, to that defined by the solid line as shown in FIG. 10. In this state, the stay 3 can be freely moved vertically. Eliminating the effort which forces downward the knob 12 will result in return of the pushing member 18 to the position defined by the imaginary line, as shown in FIG. 10, under the action of the spring 13. The engagement face 18a gets in forced contact with the engagement face 4 or 40, thus retaining the stay 3. Should the car collide with another car, when the user's head collides with the head rest, a force due to this shock will act on the head rest to lower it. Along with the fall of the stay 3, the engagement face 18a is likely to move lower. However, the pushing member 18 will abut the upper portion of the hole 11, thus blocking the pushing member 18 from pivoting. In case the engagement face 4 of the stay 3 is of tapered form, the force of engagement between the tapered engagement face 4 and face 18a will be increased as the stay 3 goes downward; thus, the latter is prevented from falling. In this case, where the equipment face 4 is tapered, an arrangement may be made so that the pin 10 may be displaced as a pivot for the pushing member 18. For example, elongated holes or slots 14 may be formed in the casing in the positions where the pins are installed, as shown in FIG. 11, so that the pin may move within the slots 14, while tensioning springs 15 may be provided to urge the pin 10 toward the stay 3.

As has been explained in the foregoing, a tapered or continuously irregular face is preferably formed on at least one side face of the stay 3, according to the present invention; an corrugated engagement face of a pushing member pivotably installed inside the casing is urged to get into forced contact engagement with the tapered or irregular surface of the stay; and a knob of the pushing member projecting out of the casing is always biased and forced upward by a spring. This structure is simplified and thus can be manufactured with a reduced cost. Besides, since the stay can be allowed to move vertically, by depressing the knob to pivot the pushing member, so that the engagement of the pushing member with the stay is eliminated, the effort necessary for this operation is less than that required for horizontal straight move of the locking plate in the prior-art device. Increasing the length from the pivot of the pushing member to the knob will permit further reduction of the necessary operating effort due to the principle of a fulcrum. The stay can be more securely retained with a greater force, when the engagement of the engagement face of the pushing member is made with a stay having a tapered or irregular face. That is, when it moves lower, the stay will be retained better and more securely. In this way, an excellent operability is assured as compared with the prior-art devices, in which the force for retention of the stay is proportional to that of the spring.

It thus will be seen that there is provided a head rest stay retaining device which attains the various objects of the invention, and is well adapted for the conditions of practical use. As various alternatives, modifications and variations of the present invention will occur to those skilled in the art, besides those embodiments discussed supra and shown in the drawings, it will be understood that the present invention extends fully to such equivalents and is to be limited in scope only as recited in the appended claims, and structural and functional equivalents thereof.

What is claimed is:

1. A head rest stay retaining device, comprising:
   a stay supporting the head rest in such a manner that the head rest can be vertically moved, said stay being provided with an engagement face formed continuously thereon to a predetermined length along the axis of the stay, said engagement face of the stay being tapered toward the axis of the stay, so as to be nearer to the axis of the stay as it extends in a downward direction;
   a support cylinder provided within the back of a seat to guide the vertical movement of said stay; and
   a pushing member having an engagement face for engaging with said engagement face of the stay, and a pivotal axis for pivoting of the pushing member about said axis, said pushing member, when pivoted in one direction, causing said engagement face of said pushing member to be in contact or engagement with said engagement face of the stay, and when pivoted in the opposite direction, causing said engagement face of said pushing member to be disengaged from said engagement face of said stay, said pushing member being further provided with a spring so as to always force said engagement face of said pushing member in the direction of said engagement face of said stay.

2. A head rest stay retaining device as set forth in claim 1, in which the pushing member is provided with a knob which will, when depressed, cause the pushing member to pivot against the expansion force of the spring, thereby causing the engagement face of the pushing member to be disengaged from said engagement face of the stay.

3. A head rest stay retaining device as set forth in claim 1, in which the engagement face of the stay is continuously irregular, thereby enhancing frictional engagement with the engagement face of the pushing member.

4. A head rest stay retaining device as set forth in claim 3, in which said continuous irregularity is in the form of corrugations or a knurled surface on the engagement face of the stay.

5. A head rest stay retaining device as set forth in claim 1, in which the engagement face of the pushing member is continuously irregular, thereby enhancing frictional engagement with the engagement face of the stay.

6. A head rest stay retaining device as set forth in claim 3, in which said engagement face of the pushing member is continuously irregular, thereby enhancing frictional engagement with the engagement face of the stay.

7. A head rest stay retaining device as set forth in claim 1, in which the engagement face of the stay terminates in a step, said step extending outwards from the engagement face, so as to prevent the stay from coming out of the retaining device.

8. A head rest stay retaining device, comprising:
a stay supporting the head rest in such a manner that the head rest can be vertically moved, said stay being provided with an engagement face formed continuously thereon to a predetermined length along the axis of said stay, said engagement face of said stay being of tapered form, so as to be nearer to the axis of said stay as it extends in a downward direction;
a support cylinder provided within the back of a seat to guide the vertical movement of said stay;
a pushing member having an engagement face; and
means to bias said pushing member, so that said engagement face of said pushing member is always forced so as to be in forced contact with said engagement face of said stay, thereby retaining said stay due to the engagement of said engagement faces.

9. A head rest stay retaining device as set forth in claim 8, in which the engagement face of the stay is formed as a continuously irregular face, thereby enhancing frictional engagement with the engagement face of the pushing member.

10. A head rest stay retaining device as set forth in claim 9, in which the irregularity comprises a knurled or corrugated surface on the engagement face of the stay.

11. A head rest stay retaining device as set forth in claim 8, in which the engagement face of the pushing member is formed as a continuously irregular face, thereby enhancing frictional engagement with the engagement face of the stay.

12. A head rest stay retaining device as set forth in claim 9, in which the engagement face of the pushing member is formed as a continuously irregular face, thereby enhancing frictional engagement with the engagement face of the stay.

13. A head rest stay retaining device as set forth in claim 8, in which the pushing member is provided with a spring which biases and forces the pushing member in such a manner that the engagement face thereof is pressed nearly perpendicularly to the engagement face of the stay.

14. A head rest stay retaining device as set forth in claim 8, in which the pushing member is provided with a pivotal mounting, so as to pivot about a pivotal axis; pivoting of the pushing member about said axis in one direction causing the engagement face of the pushing member to be in contact or engagement with the engagement face of the stay, while pivoting in the opposite direction will cause the engagement to be eliminated, and in which the pushing member is provided with a spring to continuously force and bias the engagement face of the pushing member in the direction of engagement with the engagement face of the stay.

15. A head rest stay retaining device as set forth in claim 14, in which the pushing member is provided with a knob means which will, when depressed, cause the pushing member to pivot against the forcing bias or elasticity of the spring, thereby causing the engagement face of the pushing member to be disengaged from the engagement face of the stay.

16. A head rest retaining device as set forth in claim 8, in which the engagement face of the stay terminates in a step, said step extending outwards from the engagement face, so as to prevent the stay from coming out of the retaining device.

17. A head rest stay retaining device, comprising:
a stay supporting the head rest in such a manner that said head rest can be vertically moved, said stay being provided with an engagement face formed continuously thereon to a predetermined length along the axis of said stay, said engagement face of said stay being of tapered form, so as to be nearer to the axis of the stay as it extends in a downward direction;
a support cylinder provided within the back of a seat to guide the vertical movement of said stay;
a casing formed on top of said support cylinder and having an opening or hole through which the stay extends or penetrates;
a pushing member provided within said casing, said pushing member being pivotably mounted about a pin and having a knob formed at its free end, said knob projecting outwards through a hole formed in the side face of said casing, said pushing member having an engagement face for engaging with said engagement face of said stay, an inner end of said pushing member, when said pushing member is pivoted in a down direction, causing said engagement face of said pushing member to be in contact or engagement with said engagement face of said stay, and when pivoted in the opposite direction, causing said engagement face of said pushing member to be disengaged from said engagement face of said stay;
the inner end of said pushing member being of substantially elliptical form;
said pin being positioned eccentrically from the center of said ellipse; and
spring means provided within said casing, said spring means biasing and continuously forcing said knob upward.

18. A head rest stay retaining device as set forth in claim 17, in which the engagement face of the stay is formed as a continuously irregular face, thereby enhancing frictional engagement with the engagement face of the pushing member.

19. A head rest stay retaining device as set forth in claim 18, in which said continuous irregularity is in the form of corrugations or a knurled surface on the engagement face of the stay.

20. A head rest stay retaining device as set forth in claim 17, in which the engagement face of the pushing member is formed as a continuously irregular face, thereby enhancing frictional engagement with the engagement face of the stay.

21. A head rest stay retaining device as set forth in claim 18, in which the engagement face of the pushing member is formed as a continuously irregular face, thereby enhancing frictional engagement with the engagement face of the stay.

22. A head rest stay retaining device as set forth in claim 17, in which the engagement face of the stay terminates in a step, said step extending outwards from the engagement face, so as to prevent the stay from coming out of the retaining device.

* * * * *